United States Patent
Hsu et al.

(10) Patent No.: US 8,892,143 B2
(45) Date of Patent: Nov. 18, 2014

(54) COMMUNICATION APPARATUS AND METHODS FOR MANAGING A COMMUNICATION INDICATION ASSESSMENT PROCEDURE AND A WIRELESS COMMUNICATIONS SERVICE IN COMMUNICATIONS APPARATUS

(75) Inventors: Shuo-Jen Hsu, Kaohsiung (TW); Wei-Lun Wan, Hsinchu (TW); Juei-Ting Sun, Kaohsiung (TW)

(73) Assignee: Mediatek Inc., Hsin-Chu (TW)

( * ) Notice: Subject to any disclaimer, the term of this patent is extended or adjusted under 35 U.S.C. 154(b) by 631 days.

(21) Appl. No.: 13/104,503

(22) Filed: May 10, 2011

(65) Prior Publication Data

US 2012/0289276 A1 Nov. 15, 2012

(51) Int. Cl.
*H04W 24/00* (2009.01)
*H04W 74/08* (2009.01)
*H04W 88/06* (2009.01)
*H04W 28/18* (2009.01)

(52) U.S. Cl.
CPC .......... *H04W 74/0808* (2013.01); *H04W 88/06* (2013.01); *H04W 28/18* (2013.01)
USPC ...... 455/509; 455/74.1; 455/41.2; 455/552.1; 455/553.1; 455/419; 455/272; 370/331; 370/329; 370/350

(58) Field of Classification Search
CPC ..... H04W 72/02; H04W 84/12; H04W 84/18; H04W 72/042; H04W 24/10; H04W 28/04; H04W 72/00; H04W 72/0446; H04W 72/082; H04W 72/085; H04W 72/1231; H04B 7/264
USPC ......... 455/74.1, 41.2, 552.1, 553.1, 419, 272; 370/331, 329, 350
See application file for complete search history.

(56) References Cited

U.S. PATENT DOCUMENTS

| 7,317,900 | B1 | 1/2008 | Linde et al. | |
|---|---|---|---|---|
| 7,711,027 | B2 * | 5/2010 | Honda | 375/132 |
| 8,660,596 | B2 * | 2/2014 | Yang et al. | 455/501 |
| 2006/0056492 | A1 * | 3/2006 | Honda | 375/132 |
| 2006/0092880 | A1 * | 5/2006 | Nounin et al. | 370/331 |
| 2010/0054146 | A1 * | 3/2010 | Rudland et al. | 370/252 |
| 2010/0067396 | A1 * | 3/2010 | Cui et al. | 370/252 |
| 2013/0094491 | A1 * | 4/2013 | Sun et al. | 370/345 |

* cited by examiner

*Primary Examiner* — Bobbak Safaipour
(74) *Attorney, Agent, or Firm* — McClure, Qualey & Rodack, LLP

(57) ABSTRACT

A communication apparatus is provided. The communications apparatus includes multiple radio modules and a manager. Each of the radio modules is arranged to provide a predetermined wireless communications service in compliance with a predetermined protocol. The manager is arranged to handle a communication indication assessment procedure of the radio modules to obtain an assessment result. The communication indication assessment procedure is performed by at least one of the radio modules, and the assessment result is shared with all of the radio modules.

13 Claims, 12 Drawing Sheets

COMMUNICATION APPARATUS AND METHODS FOR MANAGING A COMMUNICATION INDICATION ASSESSMENT PROCEDURE AND A WIRELESS COMMUNICATIONS SERVICE IN COMMUNICATIONS APPARATUS

BACKGROUND OF THE INVENTION

1. Field of the Invention

The invention relates to a communications apparatus having a plurality of radio modules, and more particular to a method of dynamically managing assessment in a communications apparatus having a plurality of radio modules.

2. Description of the Related Art

With the development of wireless communications technology, mobile electronic devices may be provided with more than one wireless communications service, such as a Bluetooth, Bluetooth Low Energy (BLE), Wireless Fidelity (WiFi), Worldwide Interoperability for Microwave Access (WiMAX), Digital Enhanced Cordless Telecommunications (DECT), and ZigBee wireless communications service, and so on. In this regard, due to the overlapping of operating frequencies of adjacent operating frequency bands of the different wireless communications services, transceiving performances of the mobile electronic device may degrade. Table 1 below shows the operating frequency band for a WiMAX, WiFi and Bluetooth wireless communications service.

TABLE 1

Category of Wireless Communications Services

| Usage | Wireless Communications service | Frequency band |
|---|---|---|
| Wide Area Network (WAN) | WiMAX | 2.300-2.400 GHz |
|  |  | 2.496-2.690 GHz |
|  |  | 3.300-3.800 GHz |
| Local Area Network (LAN) | WiFi | 2.412-2.4835 GHz |
|  |  | 4.9-5.9 GHz |
| Personal Area Network (PAN) | Bluetooth | 2.402-2.480 GHz |

As shown in Table 1, the frequency bands of a WiMAX, WiFi and Bluetooth wireless communications service are all located around 2.4 GHz. To avoid accessing a bad or interfered channel, some wireless communications protocols are developed with a channel assessment mechanism. However, while there is more than one radio module for providing different wireless communications services equipped within a communications apparatus, separate channel assessment performed by each radio module waste time and power.

Therefore, an efficient method of managing channel assessment in a communications apparatus having a plurality of radio modules is highly required.

BRIEF SUMMARY OF THE INVENTION

Communication apparatuses, methods for managing a communication indication assessment procedure in a communications apparatus and methods for managing a wireless communications service are provided. An embodiment of a communication apparatus comprises a plurality of radio modules, wherein each is arranged to provide a predetermined wireless communications service in compliance with a predetermined protocol, and a manager. The manager is arranged to handle a communication indication assessment procedure of the plurality of radio modules to obtain an assessment result. The communication indication assessment procedure is performed by at least one of the plurality of radio modules, and the assessment result is shared with all of the plurality of radio modules.

An embodiment of a method for managing a communication indication assessment procedure in a communications apparatus comprises: performing the communication indication assessment procedure by at least one of a plurality of radio modules; obtaining an assessment result in response to the communication indication assessment procedure; and sharing the assessment result with the plurality of radio modules, wherein the plurality of radio modules are equipped within the communications apparatus and each of the plurality of radio modules is utilized for providing a predetermined wireless communications service in compliance with a predetermined protocol.

Another embodiment of a method for managing a wireless communications service, comprising: providing a radio module arranged to provide a predetermined wireless communications service in compliance with a predetermined protocol; by the radio module, obtaining an assessment result generated according to a communication indication assessment procedure from a manager; and by the radio module, determining communication parameter(s) utilized for providing the predetermined wireless communications service according to the assessment result.

Another embodiment of a method for managing a wireless communications service, comprising: providing a radio module arranged to provide a predetermined wireless communications service in compliance with a predetermined protocol; by the radio module, performing a communication indication assessment procedure; and by the radio module, sending an assessment result of the communication indication assessment procedure to a manager arranged to handle the communication indication assessment procedure of a plurality of radio modules.

Another embodiment of a method for managing a wireless communications service, comprising: providing a manager arranged to handle a communication indication assessment procedure of a plurality of radio modules; by the manager, obtaining a result from at least one radio module performing the communication indication assessment procedure to generate an assessment result; and by the manager, sharing the assessment result with the plurality of radio modules.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
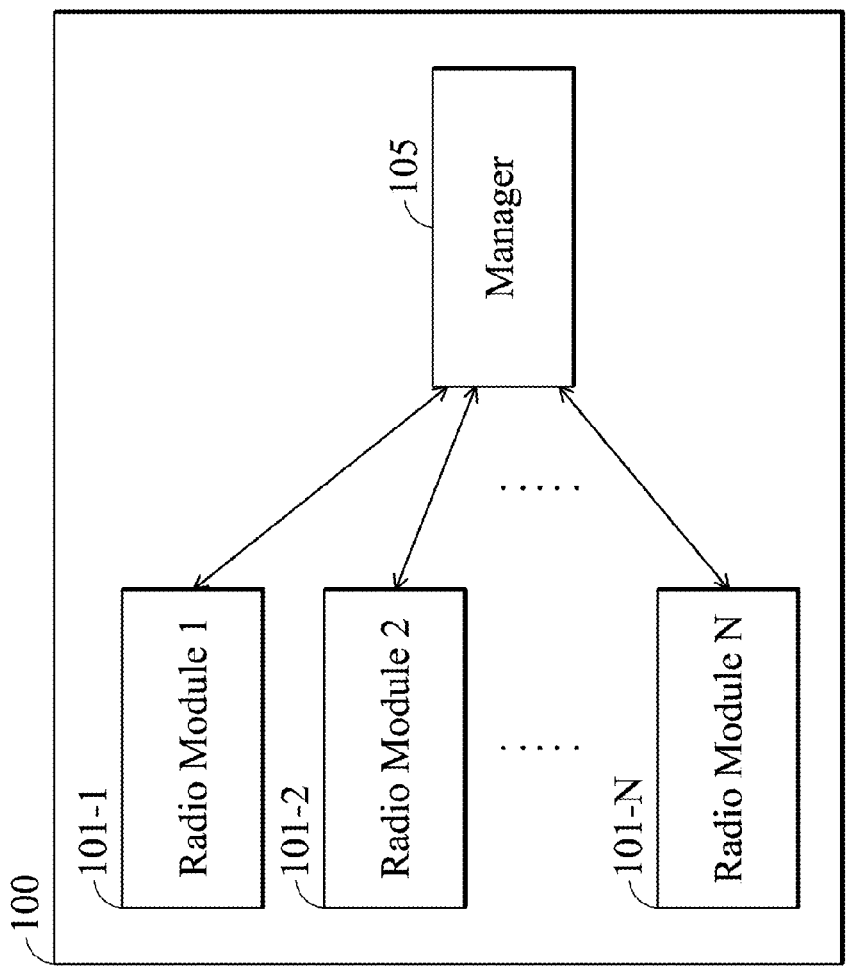
FIG. 1 shows a schematic diagram of a multi-radio communications system according to an embodiment of the invention.

Along with the advancements in wireless communications technology, radio modules providing different wireless communications services may be co-located and coexist in a communications apparatus. FIG. 1 shows a schematic diagram of a multi-radio communications system according to an embodiment of the invention. The communications apparatus 100 may comprise a plurality of radio modules 101-1, 101-2, ... 101-N, each for providing a predetermined wireless communications service in compliance with a predetermined protocol. As an example, the plurality of radio modules 101-1, 101-2, ... 101-N may comprise the radio modules that operate at around the 2.4 GHz bands, such as a Bluetooth module, a Bluetooth Low Energy (BLE) module, a Wireless Fidelity (WiFi) module, a Worldwide Interoperability for Microwave Access (WiMAX) module, a Digital Enhanced Cordless Telecommunications (DECT) module, a ZigBee module, or others. Note that in other embodiments of the invention, the plurality of radio modules 101-1, 101-2, ... 101-N may comprise other radio modules that operate at the frequency bands other than 2.4 GHz, and the invention should not be limited thereto. The communications apparatus 100 may be a mobile electronic device, such as a notebook, a cellular phone, a portable gaming device, a portable multimedia player, a Global Positioning System (GPS), a receiver, or others. According to the embodiments, one or more antennas modules may be equipped within the communications apparatus 100. When there is only one antenna equipped within the communications apparatus 100 and designed to be shared among the radio modules 101-1, 101-2, ... 101-N, the area efficiency may be improved. However, each of the radio modules may also individually comprise an antenna to transceive radio signals and the invention should not be limited thereto. It is also noted that the radio modules 101-1, 101-2, ... 101-N may be implemented as single chips, or may be integrated into a SoC (system on chip) and connected therebetween by internal wires, different but similar bus architectures, or others, and the invention should not be limited thereto.

Figure 2:
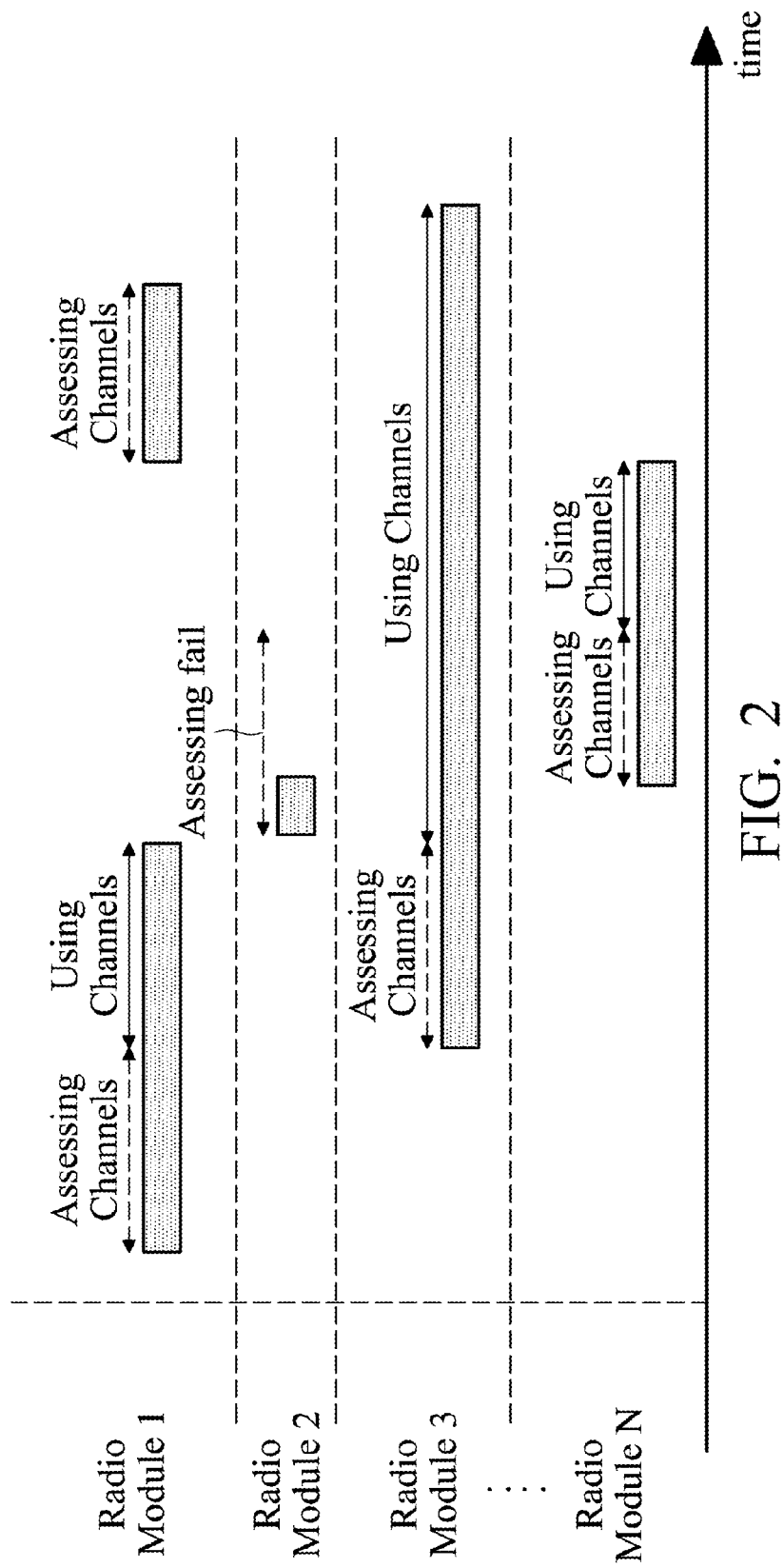
FIG. 2 shows a timing diagram of channel assessment procedures individually performed by the radio modules.

FIG. 2 shows a timing diagram of channel assessment procedures individually performed by different radio modules. In a channel assessment procedure, qualities of the channels (i.e. the frequency bands that the radio modules may use) are measured so as to assess the condition of the channels. When there is no channel information obtained in advance, the radio modules may perform channel assessment so as to find out suitable channels before using the channels. However, as previously described, separate channel assessments performed by different radio modules may cause consumption of time and/or consumption of power problems, and further cause the throughput and performances of the communications apparatus to degrade. Also, the performance becomes even worse when there is only one antenna shared between the radio modules. Therefore, according to an embodiment of the invention, a manager 105 (shown in FIG. 1) is provided to handle a communication indication assessment procedure of the plurality of radio modules 101-1, 101-2, ... 101-N. Note that in the embodiments of the invention, the manager 105 may be implemented as a hardware module, a software module or a combination thereof, and the invention should not be limited thereto. Note also that the manager 105 may also be implemented as an independent circuit, or a circuit inside of one of the plurality of radio modules 101-1, 101-2, ... 101-N, and the invention should not be limited to either cases.

According to the concept of the invention, the communication indication assessment procedure may be performed by at least one of the radio modules 101-1, 101-2, ... 101-N, so as to obtain an assessment result. According to an embodiment of the invention, in the communication indication assessment procedure, the signal qualities or throughput of a plurality of channels (i.e. the frequency bands that the radio modules may use), transmission/reception power, transmission/reception rate, or a number of connection fail times of the radio module(s) may be measured or obtained by the at least one of the plurality of radio modules. The assessment result may further be shared among all of the radio modules 101-1, 101-2, ... 101-N. Before using the channels for providing the predetermined wireless communications services, instead of performing an individual communication indication assessment procedure, the radio modules 101-1, 101-2, ... 101-N may make a request for the assessment result and determine communication parameter(s) utilized for providing the predetermined wireless communications services according to the assessment result. For example, the radio modules 101-1, 101-2, ... 101-N may determine the RF settings, channel assignments, modulation schemes and/or receiving antenna behaviors utilized for providing the corresponding wireless communications services according to the assessment result.

Figure 3:
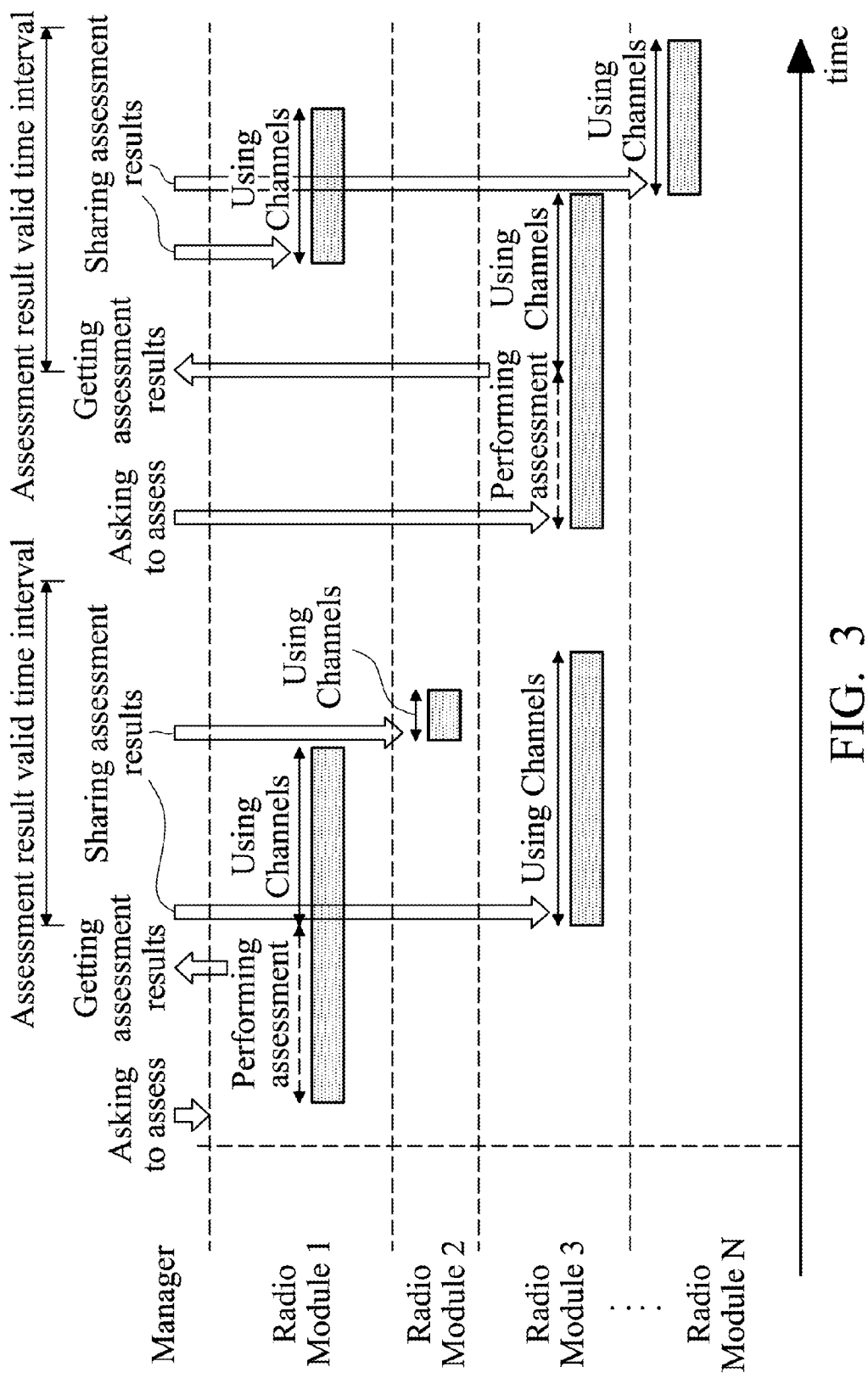
FIG. 3 shows a timing diagram of the communication indication assessment procedures handled by the manager according to an embodiment of the invention.

FIG. 3 shows a timing diagram of the communication indication assessment procedures handled by the manager according to an embodiment of the invention. According to an embodiment of the invention, the manager 105 may ask (or direct) at least one of the radio modules 101-1, 101-2, ... 101-N (such as the radio module 1 as shown) to perform a communication indication assessment procedure. After the communication indication assessment procedure, the manager 105 may get the assessment results from the radio module performing the communication indication assessment procedure, sort out the assessment results (which will be discussed in more detail in the following paragraph), and share the assessment results with all radio modules during the assessment result valid time interval. For example, as shown in FIG. 3, the manager 105 may share the assessment results to the radio modules 2 and 3 during the first assessment result valid time interval, so that the radio modules 2 and 3 may directly use the channels without performing the assessment. After the first assessment result valid time interval expires, the manager 105 may further ask (or direct) a radio module (such as the radio module 3 as shown) to perform another communication indication assessment procedure.

Note that according to another embodiment of the invention, instead of actively asking (or directing) a radio module to perform a communication indication assessment procedure, the manager 105 may also be placed in a passive position, and the invention should not be limited to either cases. For example, before performing the communication indication assessment procedure, any radio module may first make a query as to whether there is already a valid assessment result. When there is already a valid assessment result, the radio module may directly request for the valid assessment result instead of performing the communication indication assessment procedure. When there is no valid assessment result, the radio module may perform the communication indication assessment procedure, and report the assessment results to the manager 105 for sharing of the current assessment results with the other radio modules.

According to some embodiments of the invention, in the communication indication assessment procedure, the radio module may measure the signal qualities or throughput of the plurality of channels that may possibly be used. The measuring method may be implemented by, but not limited to, counting the amount of packets successfully received through the corresponding channels, measuring the signal to noise ratio (SNR), bit error rate (BER), or received signal strength indicator (RSSI) of the received radio signals, or others. According to other embodiments of the invention, the radio module may also measure the transmission/reception power, transmission/reception rate, or a number of connection fail times of the radio module(s), or others. According to yet some other embodiments of the invention, the radio module may ask a peer device to measure the signal qualities or throughput of a plurality of channels, transmission/reception power, transmission/reception rate, or a number of connection fail times of the radio module(s), or others, and obtains the assessment results therefrom.

Figure 4:
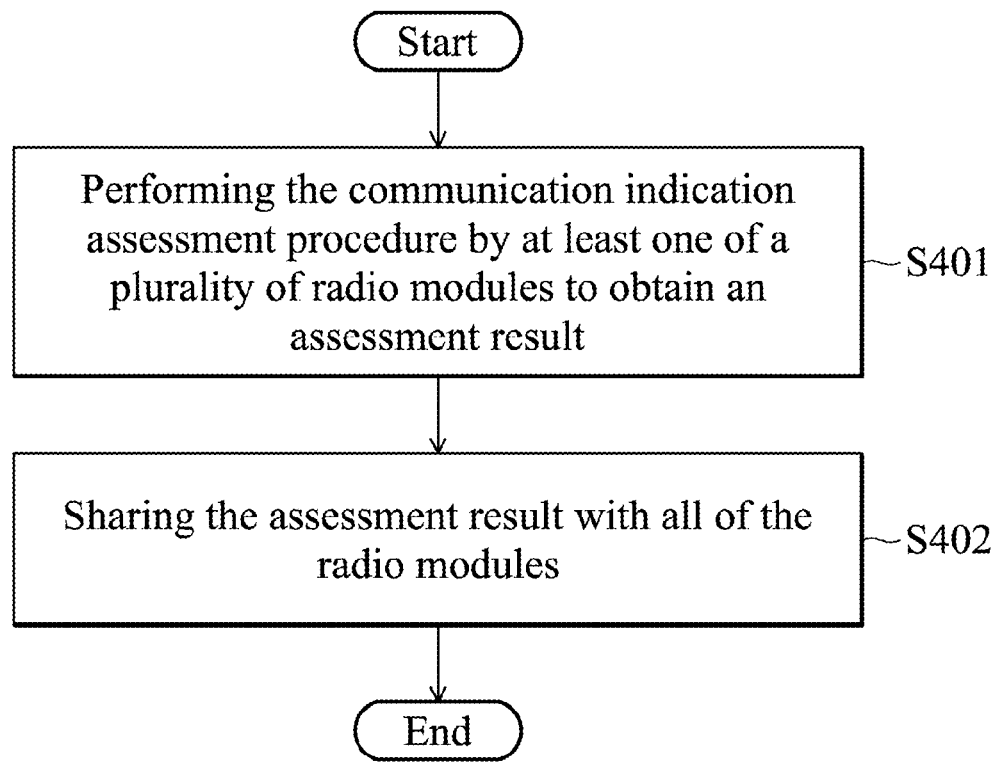
FIG. 4 shows a flow chart of a method for managing a communication indication assessment procedure in a communications apparatus according to an embodiment of the invention.

FIG. 4 shows a flow chart of a method for managing a communication indication assessment procedure in a communications apparatus according to an embodiment of the invention. Based on the concept of the invention, the communication indication assessment procedure is performed by at least one of a plurality of radio modules to obtain an assessment result (Step S401). After obtaining the assessment result, the assessment result is shared with all of the radio modules (Step S402).

Figure 5:
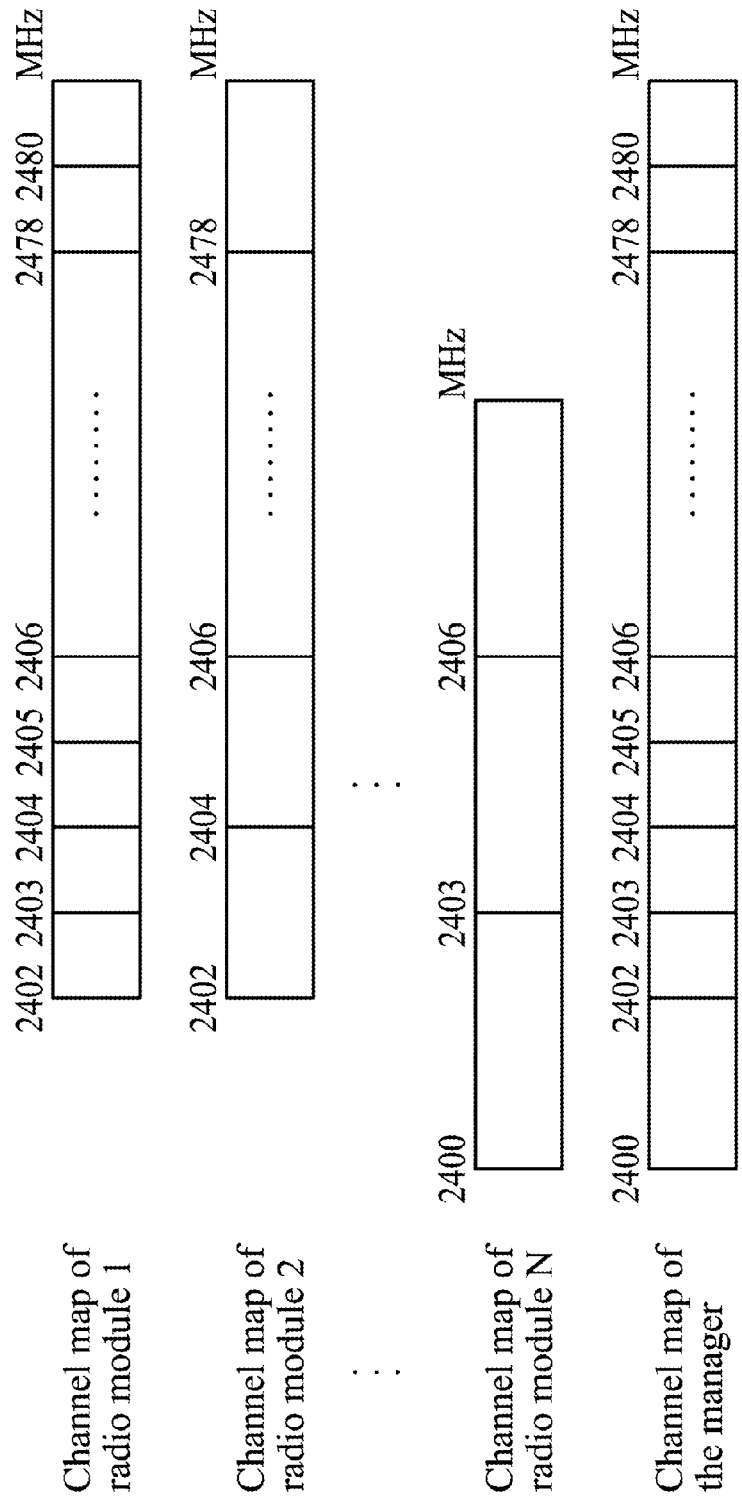
FIG. 5 shows exemplary channel maps according to an embodiment of the invention.

According to some embodiments of the invention, the manager 105 may further generate a channel map of the plurality of channels for collecting and sorting the assessment results, and recording conditions of the plurality of channels. FIG. 5 shows exemplary channel maps according to an embodiment of the invention. According to the embodiment of the invention, the resolutions of the frequency bands allocated in the channel map of the manager 105 may be flexible, so as to be containable for recording all of the channel information. For example, as shown in FIG. 5, the resolution between the 2400 MHz to 2402 MHz frequency bands may be 2 MHz, while the resolution between the 2402 MHz to 2401 MHz frequency bands may be 1 MHz. In other words, the resolution of the frequency bands allocated in the channel map of the manager 105 may be set to the minimum bandwidth of the corresponding frequency bands, which are among all of the radio modules 101-1 to 101-N, so that a resolution of the channel map maintained by the manager 105 may be fine enough for recording of the channel conditions for all the radio modules 101-1 to 101-N.

According to an embodiment of the invention, the radio modules 101-1 to 101-N may also maintain a channel map, individually, as shown in FIG. 5. In some embodiments of the invention, before performing the assessment, the radio modules 101-1 to 101-N may first initialize or reset the corresponding channel maps. For example, when there is no channel information, the channel conditions of the frequency bands in the channel map maintained by each radio module may be initialized or reset as good (i.e. usable) or unknown, depending on the design. Next, the manager 105 may generate its channel map according to the channel maps of the radio modules 101-1 to 101-N.

Figure 6:
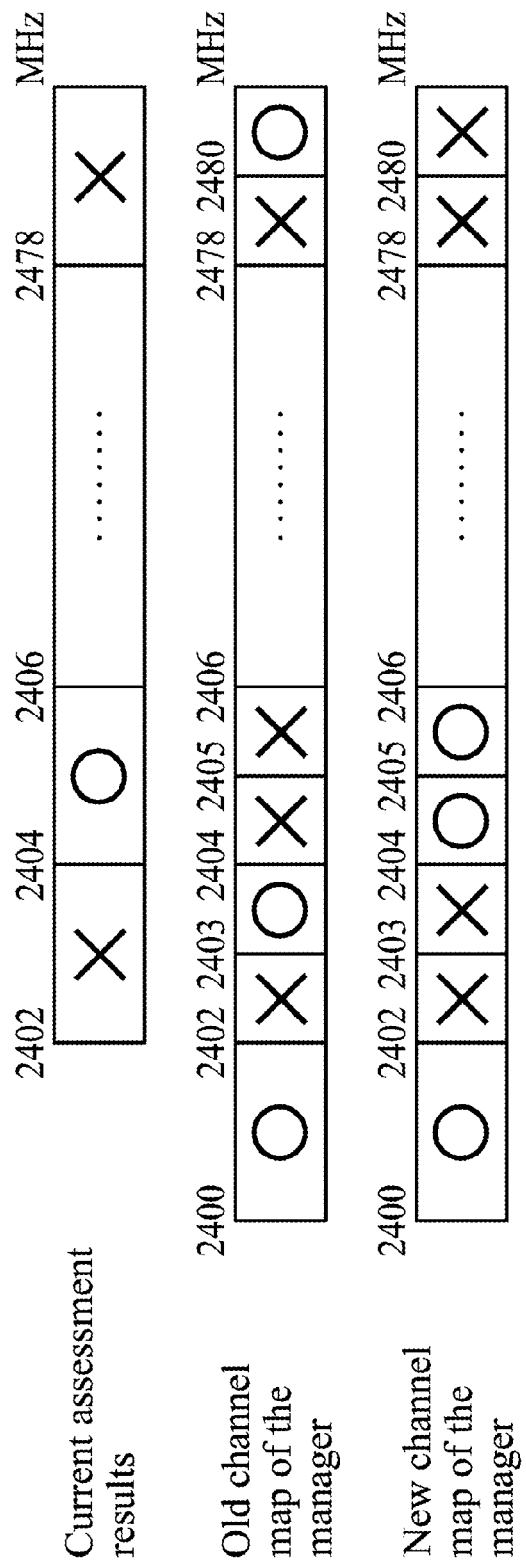
FIG. 6 is a schematic diagram showing the concept of updating the channel map of the manager after obtaining the assessment results according to an embodiment of the invention.

FIG. 6 is a schematic diagram showing the concept of updating the channel map of the manager after obtaining the assessment results according to an embodiment of the invention. After obtaining current assessment results, the old channel map maintained by the manager 105 may be updated based on the current assessment results, so as to generate a new channel map. The update algorithm may, as an example, but not limited to, assign a logic value (such as 0 or 1) to the good channels (such as the circles shown in FIG. 6) and assign another logic value (such as 1 or 0) to the bad channels (such as the crosses shown in FIG. 6), and perform an AND or an OR operation on the current assessment results and the assessment results in the old channel map to obtain a new channel map.

Figure 7:
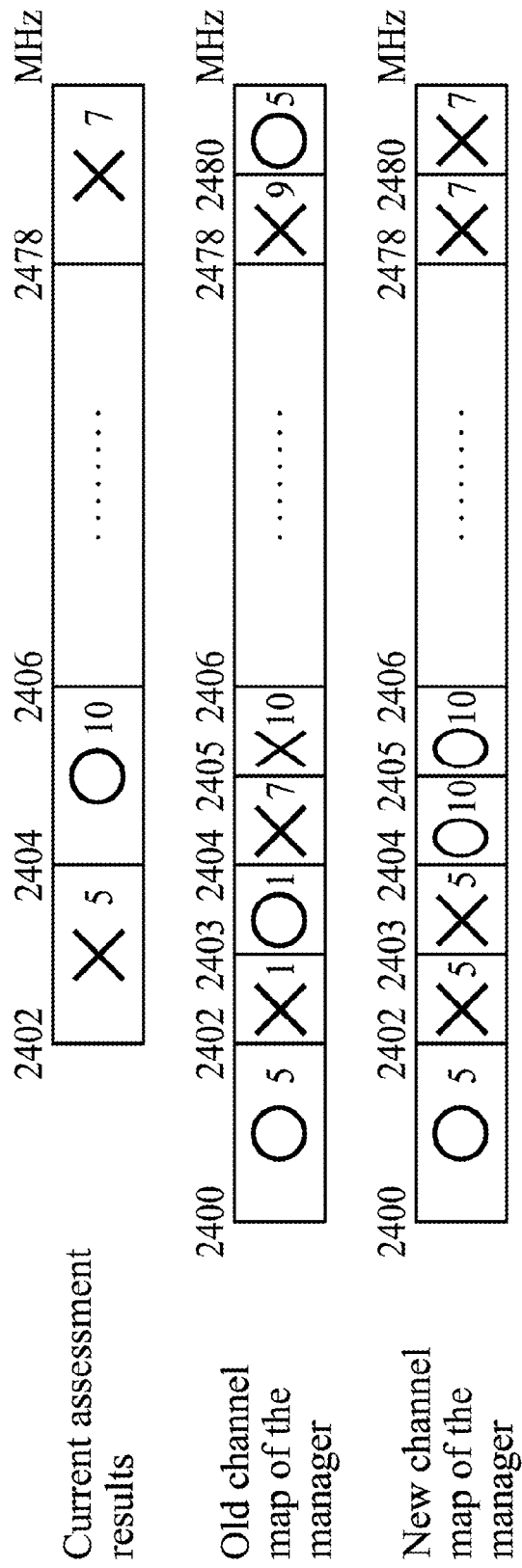
FIG. 7 is a schematic diagram showing the concept of updating the channel map of the manager after obtaining the assessment results according to another embodiment of the invention.

FIG. 7 is a schematic diagram showing the concept of updating the channel map of the manager after obtaining the assessment results according to another embodiment of the invention. In the embodiment, another update algorithm with consideration of confidence weighting factors is illustrated. As shown in FIG. 7, a confidence weighting factor, for example, from 1 to 10, may be given to each assessment result. The confidence weighting factors may be determined according to, for example, but not limited to, the assessment accuracy of the radio module performing the communication indication assessment procedure, the integrity of the assessment results, or others. The manager 105 may first check the confidence weighting factors of the currently obtained assessment results and of the old assessment results, and then determine whether the confidence weighting factors of the currently obtained assessment results are greater than a threshold (for example, that the confidence weighting factors of the old assessment results), and only update the currently obtained assessment results, which have confidence weighting factors greater than the threshold, so as to replace the corresponding old assessment results. For example, as shown in FIG. 7, the currently obtained assessment result of the channel 2402 MH to 2404 MHz has a greater confidence weighting factor (e.g. 5) than that (e.g. 1) of the old assessment result of the channel 2402 MH to 2404 MHz. Therefore, the old assessment result would be replaced by the currently obtained assessment result, so as to obtain the new channel map.

Figure 8:
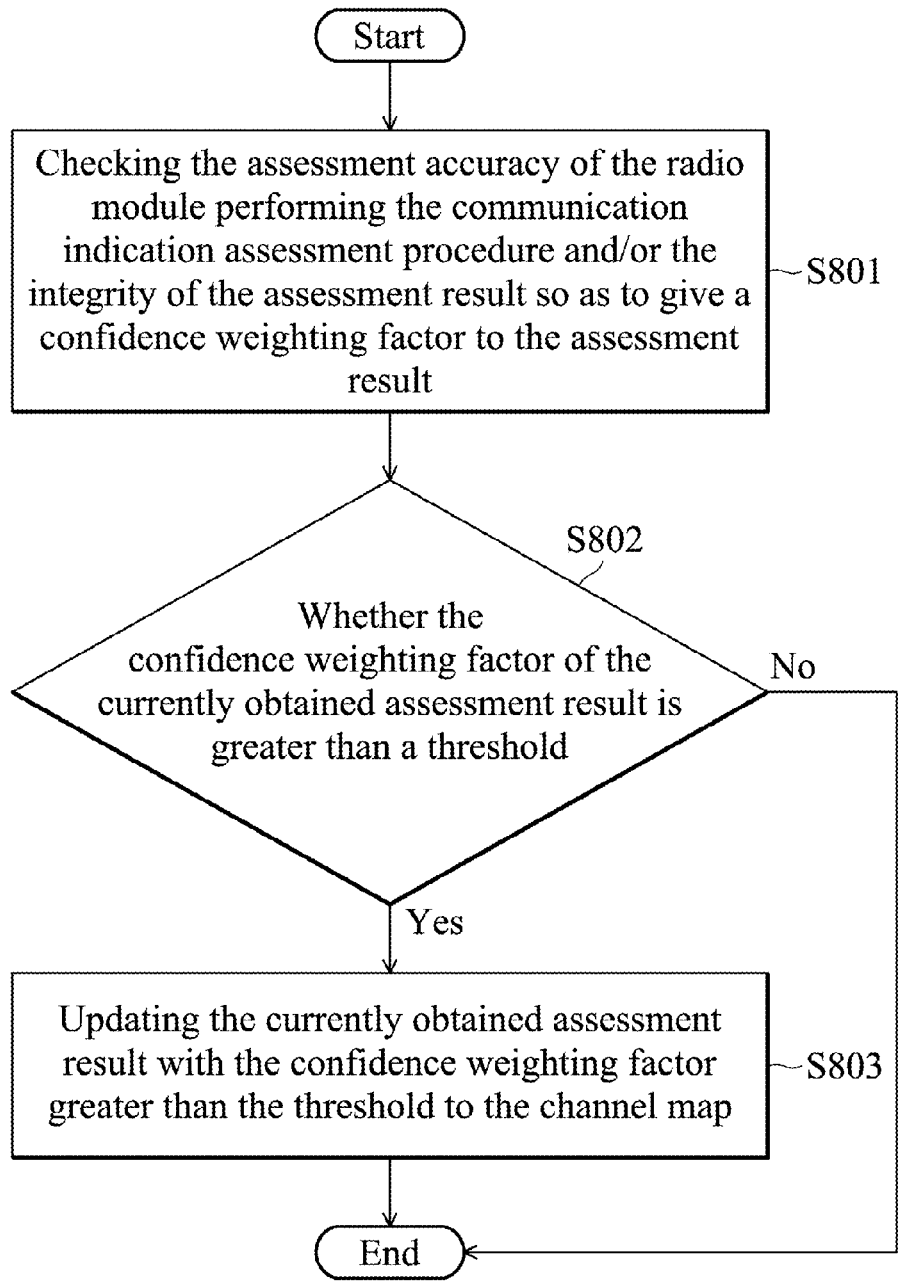
FIG. 8 shows a flow chart of a method for updating the assessment result with consideration of a confidence weighting factor according to an embodiment of the invention.

FIG. 8 shows a flow chart of a method for updating the assessment result with consideration of a confidence weighting factor according to an embodiment of the invention. After obtaining the current assessment result, the manager 105 may check the assessment accuracy of the radio module performing the communication indication assessment procedure and/or the integrity of the assessment result so as to give a confidence weighting factor to the assessment result (Step S801).

Next, the manager 105 may determine whether the confidence weighting factor of the currently obtained assessment result is greater than a threshold (Step S802). Finally, the manager 105 may only update the currently obtained assessment result with confidence weighting factor greater than the threshold to the channel map (Step S803).

Figure 9:
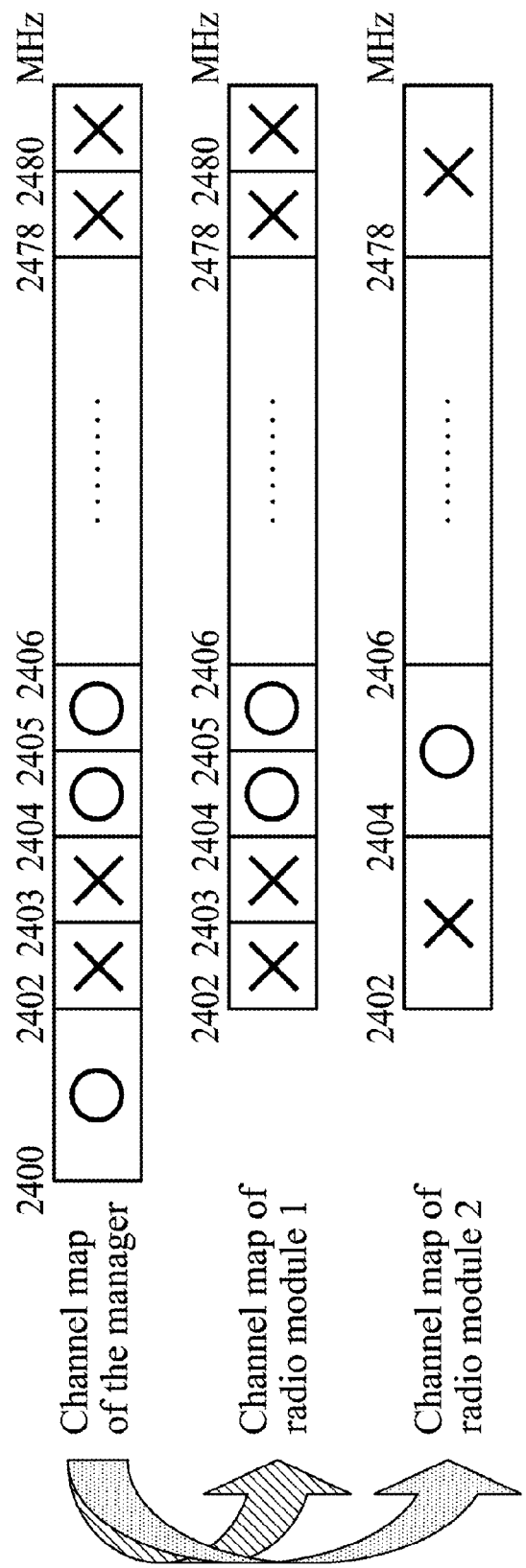
FIG. 9 is a schematic diagram showing the concept of sharing the assessment results according to an embodiment of the invention.

FIG. 9 is a schematic diagram showing the concept of sharing the assessment results with all of the radio modules according to an embodiment of the invention. According to the embodiment of the invention, when sharing the assessment results with the radio modules, the assessment results recorded in the channel map maintained by the manager may be directly copied to the channel maps of the corresponding radio modules. In addition, in some embodiments of the invention, the radio modules 101-1 to 101-N may further determine the communication parameter(s), such as adjust their RF settings, channel assignments, modulation schemes and/or receiving antenna behaviors, according to the shared assessment results. Based on the sharing mechanism, excess time required by the radio modules to separately assess channel conditions is greatly saved, and therefore, the overall transceiving performance of the communication apparatus can be greatly improved.

Figure 10:
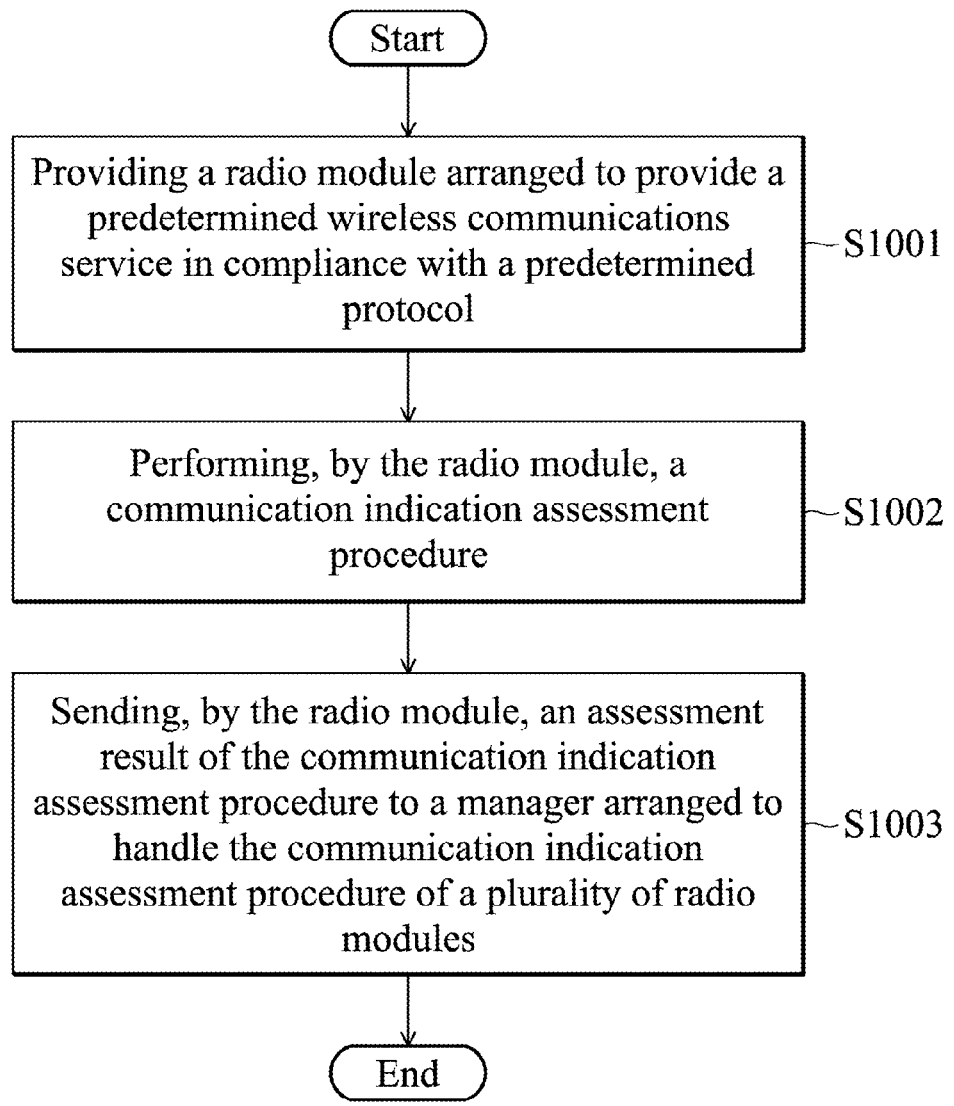
FIG. 10 is a flow chart of a method for managing a wireless communications service according to an embodiment of the invention.

FIG. 10 is a flow chart of a method for managing a wireless communications service according to an embodiment of the invention. Firstly, a radio module arranged to provide a predetermined wireless communications service in compliance with a predetermined protocol is provided (S1001). Next, a communication indication assessment procedure is preformed by the radio module (S1002). Finally, an assessment result of the communication indication assessment procedure is send by the radio module to a manager arranged to handle the communication indication assessment procedure of a plurality of radio modules (S1003).

Figure 11:
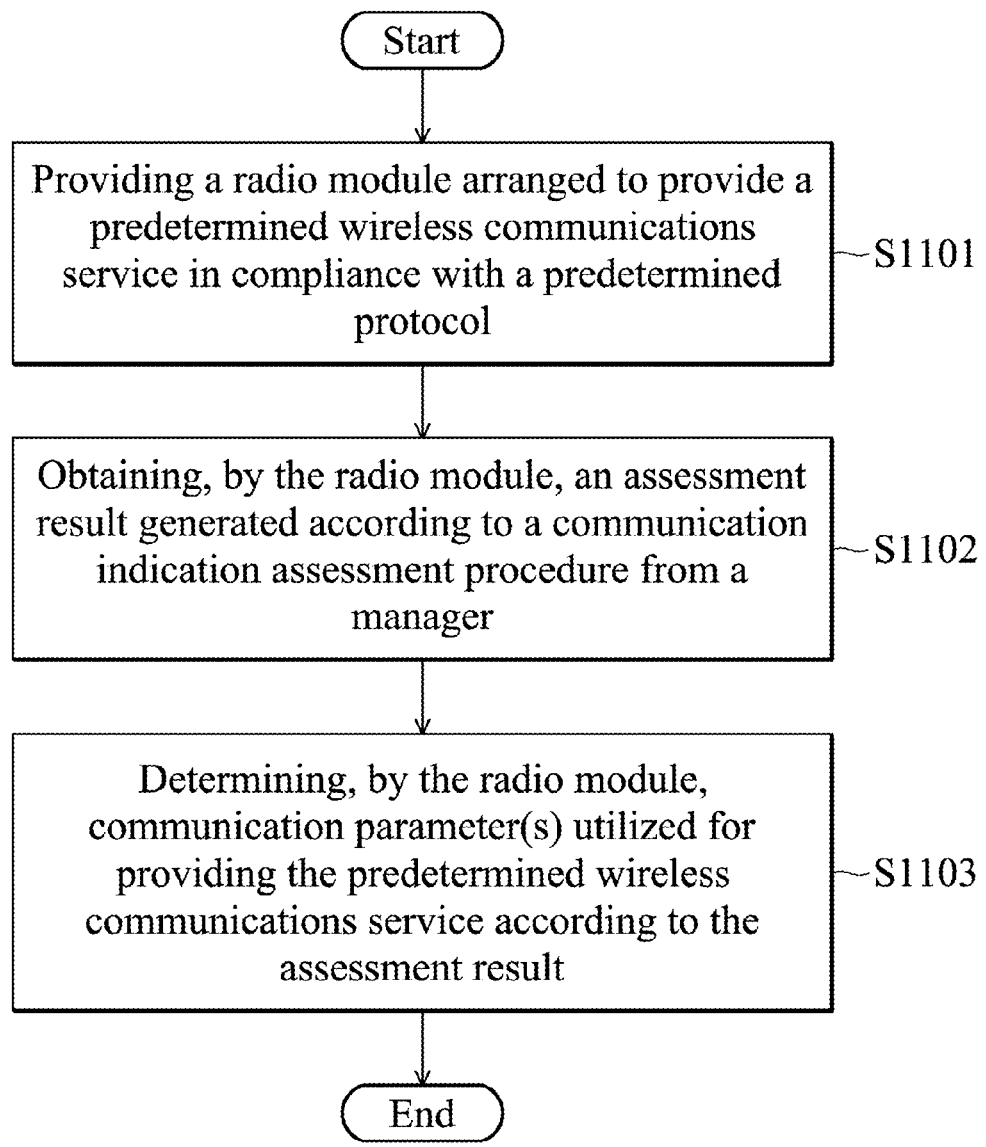
FIG. 11 is a flow chart of a method for managing a wireless communications service according to another embodiment of the invention.

FIG. 11 is a flow chart of a method for managing a wireless communications service according to another embodiment of the invention. Firstly, a radio module arranged to provide a predetermined wireless communications service in compliance with a predetermined protocol is provided (Step S1101). Next, the radio module obtains an assessment result generated according to a communication indication assessment procedure from a manager (Step S1102). Finally, communication parameter(s) utilized for providing the predetermined wireless communications service is/are determined by the radio module according to the assessment result (Step S1103).

Figure 12:
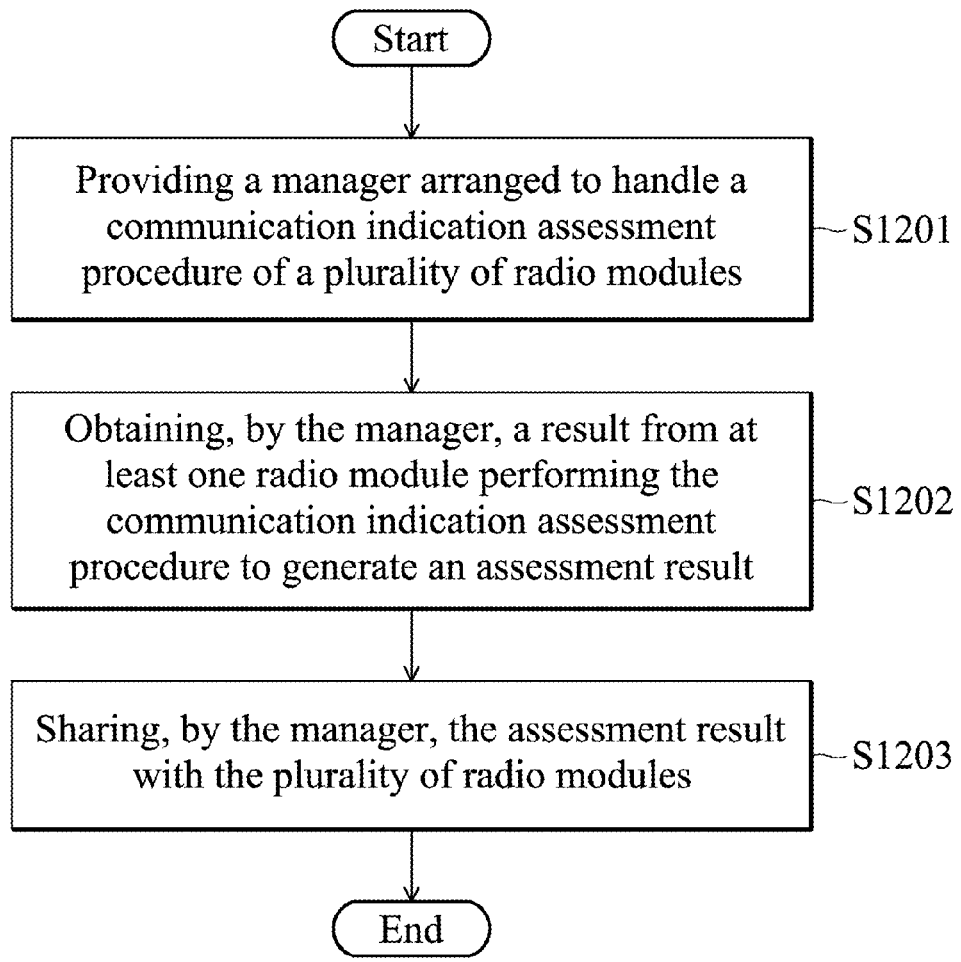
FIG. 12 is a flow chart of a method for managing a wireless communications service from a manager's perspective according to another embodiment of the invention.

FIG. 12 is a flow chart of a method for managing a wireless communications service from a manager's perspective according to another embodiment of the invention. Firstly, a manager arranged to handle a communication indication assessment procedure of a plurality of radio modules is provided (Step S1201). Next, a result is obtained by the manager from at least one radio module performing the communication indication assessment procedure to generate an assessment result (Step S1202). Finally, the assessment result is shared by the manager with the plurality of radio modules (Step S1203)

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
a plurality of radio modules, wherein each is arranged to provide a predetermined wireless communications service in compliance with a predetermined protocol; and
a manager, arranged to handle a communication indication assessment procedure of the plurality of radio modules to obtain an assessment result,
wherein the communication indication assessment procedure is performed by at least one of the plurality of radio modules, and the assessment result is shared with all of the plurality of radio modules, and
wherein the assessment result comprises a channel map of a plurality of channels for recording conditions of the plurality of channels, and
wherein a resolution of each frequency band allocated in the channel map is flexible and is set to a minimum bandwidth of the corresponding frequency band.

2. The communications apparatus as claimed in claim 1, wherein the plurality of radio modules determine communication parameter(s) utilized for providing the predetermined wireless communications services according to the assessment result.

3. The communication apparatus as claimed in claim 1, wherein in the communication indication assessment procedure, the at least one of the plurality of radio modules measures or obtains signal qualities or throughput of a plurality of channels, transmission/reception power, transmission/reception rate, or a number of connection fail times of the radio module(s).

4. A method for managing a communication indication assessment procedure in a communications apparatus, comprising:
performing the communication indication assessment procedure by at least one of a plurality of radio modules;
obtaining an assessment result in response to the communication indication assessment procedure; and
sharing the assessment result with the plurality of radio modules,
wherein the plurality of radio modules are equipped within the communications apparatus and each of the plurality of radio modules is utilized for providing a predetermined wireless communications service in compliance with a predetermined protocol, and
wherein the assessment result comprises a channel map of a plurality of channels for recording conditions of the plurality of channels, and
wherein a resolution of each frequency band allocated in the channel map is flexible and is set to a minimum bandwidth of the corresponding frequency band.

5. A method for managing a wireless communications service, comprising:
providing a radio module arranged to provide a predetermined wireless communications service in compliance with a predetermined protocol;
by the radio module, obtaining an assessment result generated according to a communication indication assessment procedure from a manager; and
by the radio module, determining communication parameter(s) utilized for providing the predetermined wireless communications service according to the assessment result,
wherein the step of obtaining an assessment result comprises: by the radio module, making a request for the assessment result instead of performing an individual communication indication assessment procedure before providing the predetermined wireless communications service.

6. The method as claimed in claim 5, wherein the step of obtaining an assessment result further comprises: by the radio module, querying whether there is any valid assessment result, and when there is already a valid assessment result, making the request for the valid assessment result instead of performing the communication indication assessment procedure.

7. The method as claimed in claim 5, wherein the assessment result comprises a channel map of a plurality of channels for recording conditions of the plurality of channels.

8. A method for managing a wireless communications service, comprising:
   providing a radio module arranged to provide a predetermined wireless communications service in compliance with a predetermined protocol;
   by the radio module, performing a communication indication assessment procedure; and
   by the radio module, sending an assessment result of the communication indication assessment procedure to a manager arranged to handle the communication indication assessment procedure of a plurality of radio modules,
   wherein the step of performing the communication indication assessment procedure comprises: by the radio module, querying whether there is any valid assessment result, and when there is no valid assessment result, performing the communication indication assessment procedure.

9. The method as claimed in claim 8, wherein the step of performing the communication indication assessment procedure comprises: measuring or obtaining signal qualities or throughput of a plurality of channels, transmission/reception power, transmission/reception rate, or a number of connection fail times of the radio module(s).

10. The method as claimed in claim 8, wherein the assessment result comprises a channel map of a plurality of channels for recording conditions of the plurality of channels.

11. A method for managing a wireless communications service, comprising:
    providing a manager arranged to handle a communication indication assessment procedure of a plurality of radio modules;
    by the manager, obtaining a result from at least one radio module performing the communication indication assessment procedure to generate an assessment result; and
    by the manager, sharing the assessment result with the plurality of radio modules,
    wherein the plurality of radio modules are equipped within a communications apparatus and each of the plurality of radio modules is utilized for providing a predetermined wireless communications service in compliance with a predetermined protocol, and
    wherein the assessment result comprises a channel map of a plurality of channels for recording conditions of the plurality of channels, the channel map is generated according to a confidence weighting factor, and the method further comprises:
    by the manager, updating the result obtained from the at least one of the plurality of radio modules to the channel map when the confidence weighting factor is greater than a threshold,
    wherein the confidence weighting factor is determined according to integrity of the result.

12. The method as claimed in claim 11, further comprising:
    by the manager, directing the at least one radio module to perform the communication indication assessment procedure.

13. The method as claimed in claim 11, wherein the step of sharing the assessment result comprises: by the manager, receiving a request for the assessment result from a radio module of the plurality of radio modules, and sharing the assessment result with the radio module sending the request.

* * * * *